United States Patent [19]

Yokoyama et al.

[11] Patent Number: 4,558,001
[45] Date of Patent: Dec. 10, 1985

[54] SILVER HALIDE PHOTOGRAPHIC LIGHT-SENSITIVE MATERIALS CONTAINING NONIONIC SURFACE ACTIVE ANTISTATIC AGENT

[75] Inventors: Shigeki Yokoyama; Hisashi Okamura; Yukio Maekawa; Hiroshi Kawasaki, all of Kanagawa, Japan

[73] Assignee: Fuji Photo Film Co., Ltd., Kanagawa, Japan

[21] Appl. No.: 599,870

[22] Filed: Apr. 13, 1984

[30] Foreign Application Priority Data

Apr. 14, 1983 [JP] Japan .................................. 58-66007

[51] Int. Cl.$^4$ ................................................ G03C 1/32
[52] U.S. Cl. .................................. 430/527; 430/631; 430/637
[58] Field of Search ........................ 430/527, 631, 637

[56] References Cited

U.S. PATENT DOCUMENTS

| | | | |
|---|---|---|---|
| 3,038,804 | 6/1962 | Knex et al. ........................ | 430/637 |
| 3,415,649 | 12/1968 | Nishio et al. ...................... | 430/637 |
| 3,850,641 | 11/1974 | Horigome et al. ................ | 430/527 |
| 4,072,639 | 2/1978 | Yamaguchi et al. .............. | 430/637 |
| 4,209,329 | 6/1980 | Lohner .............................. | 430/631 |
| 4,220,707 | 9/1980 | Ohmura et al. .................. | 430/280 |
| 4,251,626 | 2/1981 | Minamizono et al. | |
| 4,266,016 | 5/1981 | Date et al. ........................ | 430/527 |
| 4,272,615 | 6/1981 | Yoneyama et al. ............... | 430/527 |
| 4,284,709 | 8/1981 | Tomka ............................... | 430/637 |
| 4,346,163 | 8/1982 | Takeyama et al. ............... | 430/280 |
| 4,510,233 | 4/1985 | Yokoyama et al. .............. | 430/527 |

FOREIGN PATENT DOCUMENTS 861134 6/1957 United Kingdom .

*Primary Examiner*—Jack P. Brammer
*Attorney, Agent, or Firm*—Sughrue, Mion, Zinn Macpeak & Seas

[57] ABSTRACT

A silver halide photographic light-sensitive material is disclosed wherein at least one gelatin-containing layer thereof contains at least one nonionic surface active agent having reactive groups, the agent being represented by the following formula (I), (II) or (III)

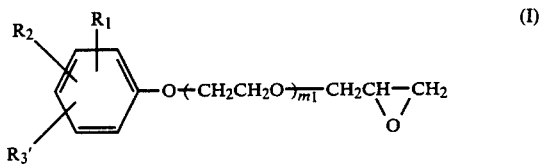

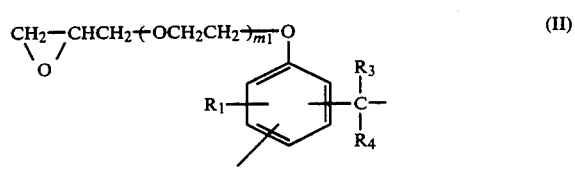

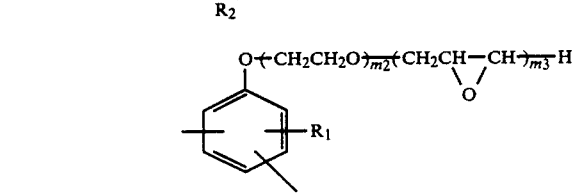

wherein $R_1$, $R_2$ and $R_3'$ each represents a hydrogen atom or a halogen atom, or an unsubstituted or substituted alkyl, aryl, alkoxyl, acyl, amido, sulfonamido, carbamoyl, or sulfamoyl group; $R_3$ and $R_4$ each represents a hydrogen atom, an unsubstituted or substituted alkyl or aryl group, or a heteroaromatic ring, $R_3$ and $R_4$ may combine to form a ring; $m_1$ and $m_2$, which may be the same or different, are 2 to 40, each representing the average degree of polymerization of ethylene oxide; $m_3$ is 0 or 1; and $n_1$ and $n_2$ represent the ratios in the copolymer, and $n_1$ is 1 to 100 and $n_2$ is 0 to 99, the sum thereof being 100.

10 Claims, No Drawings

SILVER HALIDE PHOTOGRAPHIC LIGHT-SENSITIVE MATERIALS CONTAINING NONIONIC SURFACE ACTIVE ANTISTATIC AGENT

FIELD OF THE INVENTION

The present invention relates to silver halide photographic light-sensitive materials (hereinafter, referred to as "photographic light-sensitive materials") and particularly to photographic light-sensitive materials having an improved antistatic property.

BACKGROUND OF THE INVENTION

Since photographic light-sensitive materials are generally composed of a support having an electrically insulating property and photographic layers, static charges often accumulate when the photographic light-sensitive materials are produced or used due to contact friction between the surfaces of the same or different kinds of materials or upon separation thereof from other materials. The accumulated static charges cause various difficulties. The most serious difficulty is that the light-sensitive emulsion layer is exposed to light due to discharge of the accumulated static charges prior to development. This causes dot spots or branch-like or feathery linear spots upon development of the photographic film. This phenomenon results in the so-called static marks, by which the commercial value of the photographic films is markedly decreased or, sometimes, completely destroyed. For example, it is easily understood that static marks result in a mistake in a judgment when they appear on medical or industrial X-ray films. Since this phenomenon only becomes evident upon development, it is a very troublesome problem. Further, the accumulated static charges cause secondary difficulties, for example, dust may adhere to the surface of the films or uniform application of photographic layers to the films cannot be achieved.

Such static charges often accumulate when photographic light-sensitive materials are produced or used, as described above. For example, during production, static charges arise due to contact friction between the photographic film and a roll or due to separation of the support surface and the emulsion surface when the photographic film is wound or rewound. Further, static charges are generated in an automatic photographing apparatus due to contact of the X-ray film with machine parts or with fluorescent sensitizing paper or upon separation therefrom. In addition, static charges are generated due to contact with packing materials, etc. Generation of static marks induced by accumulation of such static charges becomes rather substantial as the sensitivity of photographic light-sensitive materials is increased as the processing rate increases. Particularly, in recent years, static marks are more easily generated, because photographic light-sensitive materials have come to have high sensitivity and there are many opportunities for subjecting the materials to severe handling such as high speed application, high speed photography or high speed automatic processing, etc.

In order to aid in eliminating the problems created by static electricity, antistatic agents are preferably added to the photographic light-sensitive materials. Antistatic agents utilized in the photographic light-sensitive materials must have different characteristics than antistatic agents conventionally used in other fields because there are various restrictions which are characteristic to photographic light-sensitive materials. Antistatic agents which can be utilized in photographic light-sensitive materials must not only have excellent antistatic properties but they must not adversely influence the photographic properties, such as sensitivity, fog, granularity or sharpness. Further, they must not adversely influence the film strength of the photographic light-sensitive materials (namely, scratches are not easily formed by friction or scratching), they must not adversely influence antiadhesive properties (namely, the surface of the photographic light-sensitive material does not easily adhere to the surface of the photographic light-sensitive material or other materials), they must not promote fatigue of processing solutions for photographic light-sensitive materials, or they must not reduce the adhesive strength between layers of the photographic light-sensitive materials. Accordingly, the application of antistatic agents to photographic light-sensitive materials is restricted.

One method of removing difficulties due to static electricity comprises increasing the electrical conductivity of the surface of the photographic light-sensitive materials in order to disperse static charges in a short time before the accumulated charges are discharged.

Thus, methods of increasing the electrical conductivity of the support in photographic light-sensitive materials or various kinds of surface coating layers thereof have been proposed. Attempts have been made at utilizing various hygroscopic substances and water-soluble inorganic salts, certain kinds of surface active agents and polymers. For example, the use of polymers described in U.S. Pat. Nos. 2,882,157, 2,972,535, 3,062,785, 3,262,807, 3,514,291, 3,615,531, 3,753,716 and 3,938,999, etc., surface active agents described in U.S. Pat. Nos. 2,982,651, 3,428,456, 3,457,076, 3,454,625, 3,552,972 and 3,655,387, etc., and metal oxides and colloidal silica described in U.S. Pat. Nos. 3,062,700, 3,245,833 and 3,525,621, etc., is known.

However, it is very difficult to employ these substances in photographic light-sensitive materials because they are particularly suited for one kind of film support or photographic composition. Accordingly, they produce good results when used with a specified film support or photographic emulsion or other photographic elements. However, they are useless for preventing generation of static charges when used with different film supports and photographic elements, or they have an excellent antistatic properties but adversely influence the photographic properties such as sensitivity of the photographic emulsions, fog, granularity or sharpness, etc., or they have an excellent antistatic properties just after production but the antistatic properties deteriorate with the passage of time.

Nonionic surface active agents having one polyoxyethylene chain in the molecule are described in British Pat. No. 861,134 and German Pat. No. 1,422,309. These agents have excellent antistatic properties.

However, when they are employed in photographic light-sensitive materials the following problems occur: (1) sensitivity is markedly deteriorated, (2) since their antistatic properties deteriorate with the passage of time, although good antistatic properties just after production exist, the antistatic properties of products become inferior when the products are used, (3) when applied to X-ray-sensitive materials, dotted or meshlike uneven density (which is called "screen contamination") is formed on the X-ray-sensitive materials after development, because the sensitive materials come into contact with sensitizing paper (fluorescent screen) when photographs are made, and (4) the nonionic surface active agent in the light-sensitive material dissolves in the developer, contaminating the developer and rollers. This contamination sometimes attaches to the film that passes through the developer and rollers, slowing down the developing speed or soiling the film. These adverse effects aggravate the value of the product or sometimes lead to the total loss of the value of the product.

U.S. Pat. No. 3,850,641 discloses the use of an ethylene oxide adduct of a phenol-formaldehyde resin as an antistatic agent for photographic light-sensitive materials. This compound is somewhat superior to the above-mentioned nonionic surface active agent with only one polyoxyethylene chain per molecule thereof; however, it still is not completely free of the four disadvanrages described above.

Japanese Patent Application (OPI) Nos. 100546/80 and 74246/81 (the term "OPI" as used herein refers to a "published unexamined Japanese patent application") disclose the improvement of nonionic surface active agents through the introduction of a reactive group thereinto.

However, the sensitivity of photographic light-sensitive materials containing these nonionic surface active agents is greatly decreased and the intended performance is not exhibited.

SUMMARY OF THE INVENTION

A first object of the present invention is to provide antistatic photographic light-sensitive materials where the photographic properties are not affected, such as desensitization does not occur.

A second object of the present invention is to provide antistatic photographic light-sensitive materials where screen contamination does not occur.

A third object of the present invention is to provide antistatic photographic light-sensitive materials having antistatic properties which do not change after production with the passage of time.

A fourth object of the present invention is to provide stabilized antistatic photographic light-sensitive materials where the antistatic properties hardly change due to variations in conditions for producing the antistatic agent.

A fifth object of the present invention is to provide antistatic photographic light-sensitive materials which do not contaminate the developer and rollers.

A sixth object of the present invention is to provide antistatic photographic light-sensitive materials which do not contaminate the photographic light-sensitive materials if subsequently introduced into the developer and rollers.

Research has been conducted on an antistatic agent which does not adversely affect the characteristic properties of photographic light-sensitive materials. As the result, it has now been found the objects of the present invention are achieved with a nonionic surface active agent having reactive groups, the agent being represented by the following formula (I), (II) or (III). When this antistatic agent is incorporated into at least one gelatin-containing layer of the photographic light-sensitive material, the resulating photographic light-sensitive material is almost completely free of the disadvantages of conventional materials.

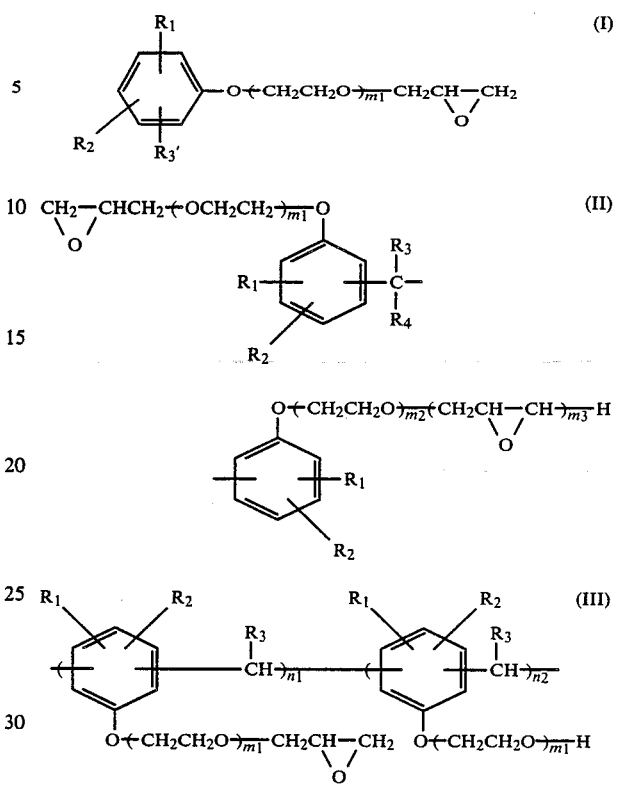

wherein $R_1$, $R_2$ and $R_3'$ each represents a hydrogen atom or a halogen atom, or an unsubstituted or substituted alkyl, aryl, alkoxyl, acyl, amido, sulfonamido, carbamoyl, or sulfamoyl group; $R_3$ and $R_4$ each represents a hydrogen atom, an unsubstituted or substituted alkyl or aryl group, or a heteroaromatic ring, and $R_3$ and $R_4$ combine to form a ring; $m_1$ and $m_2$, which may be the same or different, range from 2 to 40, each of $m_1$ and $m_2$ representing the average degree of polymerization of oxyethylene moiety; $m_3$ is 0 or 1; and $n_1$ and $n_2$ each represents the ratios of the copolymer composition, and $n_1$ is 1 to 100 and $n_2$ is 0 to 99, with the sum of $n_1$ and $n_2$ being 100.

DETAILED DESCRIPTION OF THE INVENTION

Preferably, $R_1$, $R_2$ and $R_3'$ each is a hydrogen atom; a halogen atom such as a chlorine atom and a bromine atom; a $C_{1-20}$ unsubstituted or substituted alkyl group such as a methyl, ethyl, i-propyl, t-butyl, t-amyl, t-hexyl, t-octyl, nonyl, decyl, dodecyl, trichloromethyl, tribromomethyl, 1-phenylethyl, or 2-phenyl-2-propyl group; an unsubstituted or substituted aryl group such as a phenyl group and a p-chlorophenyl group; an unsubstituted or substituted alkoxyl group represented by —$OR_5$, wherein $R_5$ is a $C_{1-20}$ unsubstituted or substituted alkyl or aryl group; an acyl group represented by —$COR_5$, where $R_5$ is as described above; an amido group represented by —$NR_6COR_5$, wherein $R_6$ is a hydrogen atom or a $C_{1-20}$ alkyl group and $R_5$ is as described above; a sulfonamido group represented by —$NR_6SO_2R_5$, where $R_5$ and $R_6$ are as described above; a carbamoyl group represented by

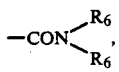

where $R_6$ is as described above, or a sulfamoyl group represented by

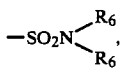

where $R_6$ is as described above.

$R_3$ and $R_4$ each is a hydrogen atom; an unsubstituted or substituted alkyl group such as methyl, ethyl, n-propyl, i-propyl, n-heptyl, 1-ethylamyl, n-undecyl and tribromomethyl groups; an unsubstituted or substituted aryl group such as phenyl, naphthyl, trichlorophenyl, p-chlorophenyl, p-methoxyphenyl, and m-nitrophenyl groups; or a heteroaromatic ring such as a furyl group. $R_3$ and $R_4$ combine to form a ring such as a cyclohexyl ring. $R_3$ and $R_4$ each more preferably is a hydrogen atom, or a $C_{1-8}$ alkyl, phenyl, or furyl group.

The numerals $m_1$ and $m_2$ each denotes the average degree of polymerization of the oxyethylene units $-(OCH_2CH_2-)$, which is 2 to 40, preferably is 5 to 30, and particularly preferably is 8 to 20. $m_1$ and $m_2$ may be the same or different. $m_3$ is 0 or 1.

$n_1$ and $n_2$ each denotes the ratio of the composition of the copolymer, and $n_1$ is 0 to 100 and $n_2$ is 0 to 99, and the sum of $n_1$ and $n_2$ is 100.

The compound represented by the formula (I) in the present invention can be synthesized by reacting a phenol represented by the formula (IV):

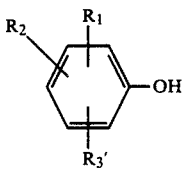

wherein $R_1$, $R_2$ and $R_3'$ are defined as above, with ethylene oxide, with simultaneous addition polymerization of ethylene oxide, reacting the reaction product with an allyl halide in the presence of a base catalyst, and finally oxidizing the reaction product with an oxidizing agent such as peracetic acid.

The addition polymerization of ethylene oxide can be accomplished in a conventional manner by bubbling ethylene oxide gas into a reaction mixture containing a compound of the formula (IV) in the presence of a base such as sodium hydroxide and potassium hydroxide. This method is described in Hiroshi Horiguchi, *Shin Kaimen Kasseizai*, pages 644 to 670, published by Sankyo Shuppan, 1975.

The compound represented by the formula (II) in this invention can be synthesized by reacting a bisphenol represented by formula (V):

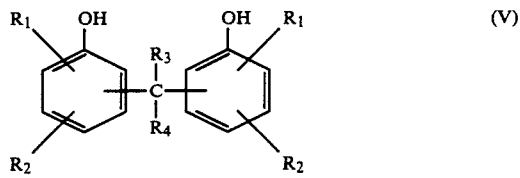

wherein $R_1$, $R_2$, $R_3$ and $R_4$ each has the same meaning as described above, with ethylene oxide, with simultaneous addition polymerization of ethylene oxide, reacting the reaction product with an allyl halide, and finally oxidizing the reaction product.

The synthesis of bisphenols represented by the formula (V) is not limited, with the following two processes being generally utilized.

(1) A process which comprises reacting a phenol derivative represented by the formula (VI):

wherein $R_1$ and $R_2$ each has the same meaning as described above, with an aldehyde represented by the formula (VII):

wherein $R_3$ has the same meaning as described above, but with the number of carbon atoms in $R_3$ being 2 or more, in the presence of an acid catalyst in the same manner as described in *Journal of the American Chemical Society*, Vol. 74, pages 3410 to 3411 (1952).

(2) A process which comprises reacting a phenol derivative represented by the formula (VI) with a ketone represented by the formula (VIII) in the same manner as described in U.S. Pat. No. 2,468,982:

wherein $R_3$ and $R_4$ each has the same meaning as described above.

The compound represented by the formula (III) in the present invention can be synthesized by reacting a phenolic resin represented by the formula (IX):

wherein $R_1$, $R_2$ and $R_3$ each has the same meaning as described above, with ethylene oxide, with simultaneous addition polymerization of ethylene oxide, reacting the reaction product with an allyl halide, and finally oxidizing the reaction product.

The phenol resin is a mixture of polymers having various degrees of polymerization as described in *Kagaku Daijiten*, edited by Kagaku Daijiten Editorial committee, Vol. 7, pages 731 to 733 (published by Kyoritsu Shuppan Co., 1964), Minoru Imoto, *Gosei Jushi Kagaku*, page 193 (published by Zoshindo, 1949) and Shinichi Murakami, *Phenol Resin*, pages 22 and 23 (published by Nikkan Kogyo Shinbunsha, 1961).

There are no specific limitations on the average degree of polymerization of the phenol resin represented by the formula (IX).

Examples of nonionic surface active agents having reactive groups represented by the formula (I), (II) or (III) are shown below.

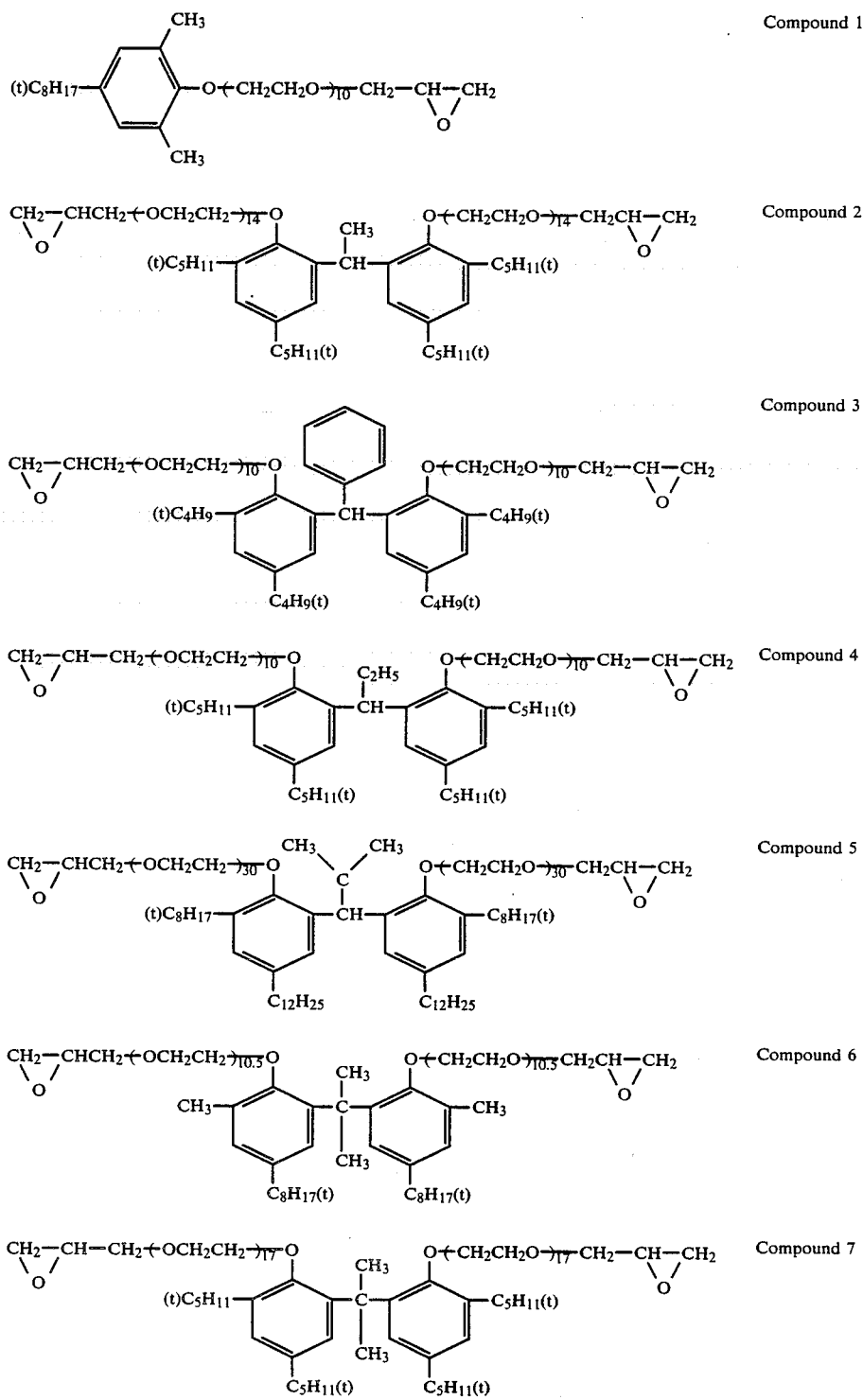

-continued
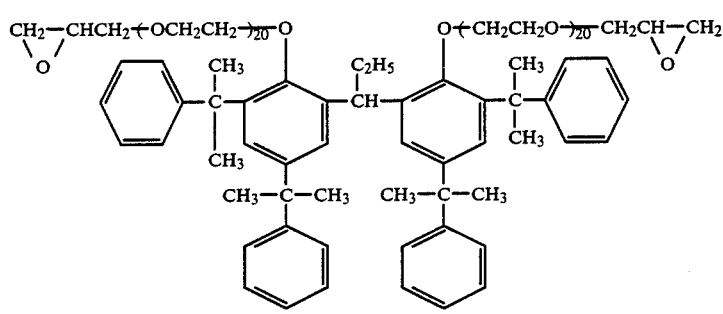
Compound 8
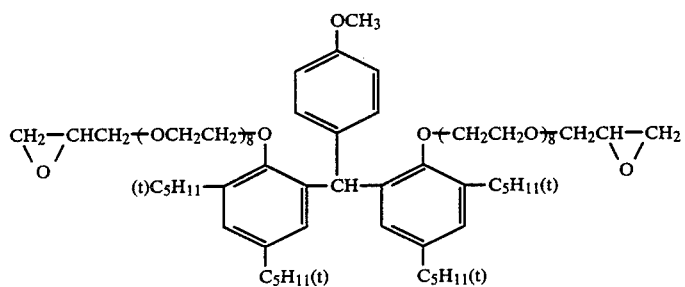
Compound 9
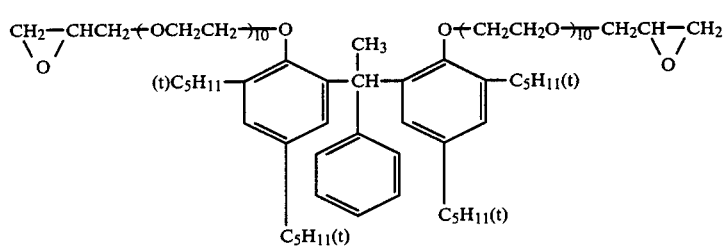
Compound 10
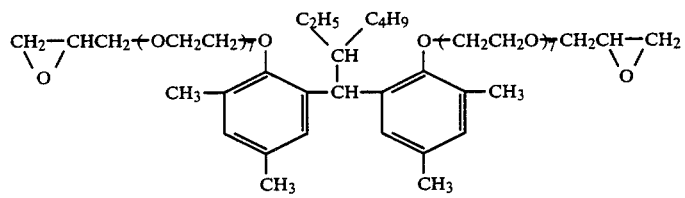
Compound 11
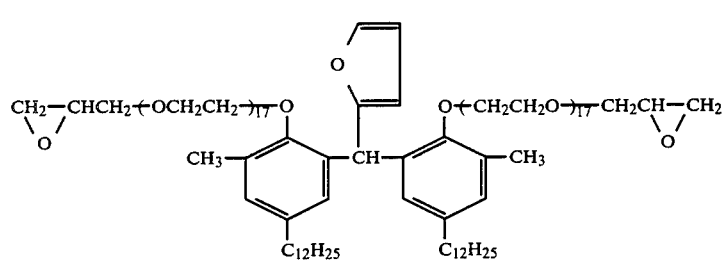
Compound 12
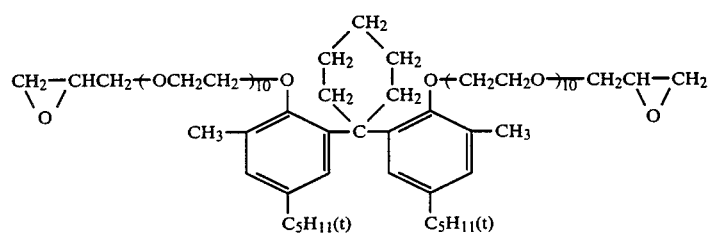
Compound 13

-continued

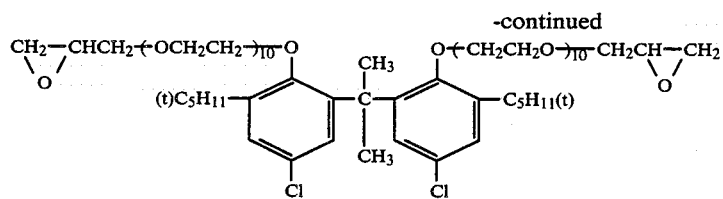
Compound 14

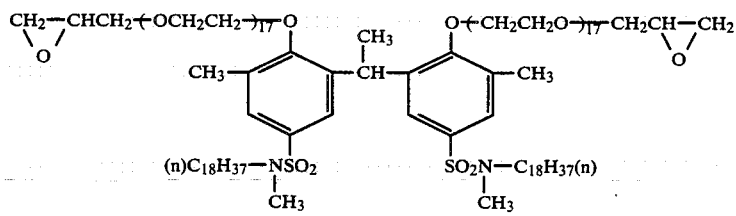
Compound 15

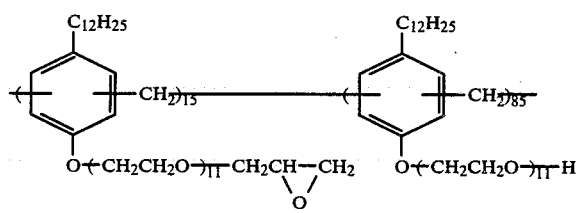
Compound 16

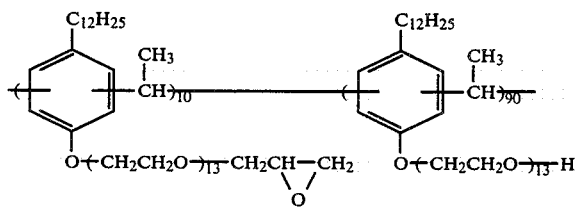
Compound 17

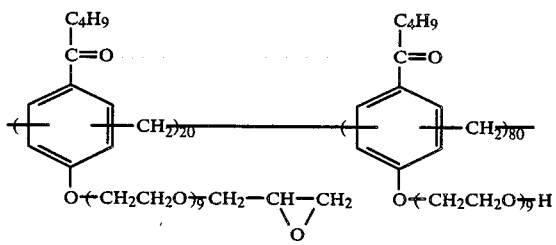
Compound 18

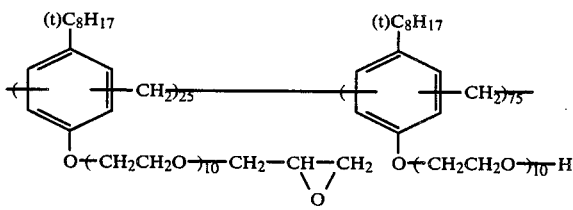
Compound 19

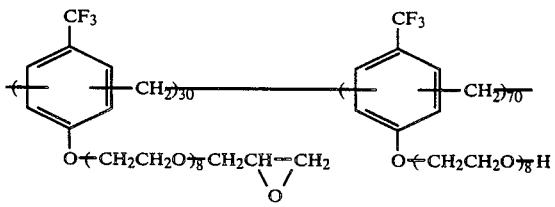
Compound 20

Particularly preferred examples of the nonionic surface active agents having reactive groups represented by the formula (I), (II) or (III) include Compounds 2, 3, 4 and 16 shown above.

Examples of the synthesis of nonionic surface active agents of the present invention having a reactive group in the molecule are described below. Unless otherwise indicated, all parts, percents, ratios and the like are by weight.

SYNTHESIS EXAMPLE 1

Synthesis of Compound 1

(1) Synthesis of 2,6-Dimethyl-4-t-octylphenol:

Into a reactor equipped with a stirrer, a thermometer, a dropping funnel, and a condenser were charged 61.1 g of 2,6-xylenol and 95 ml of isooctene (isobutylene dimer). A mixture of 50 ml each of concentrated sulfuric acid (98%) and methanol was added slowly over a 15-minute interval with stirring at room temperature (about 20°–30° C.). The reaction mixture was heated to 50° C. in a water bath, and stirring was continued for 3.5 hours at that temperature. The reaction mixture was cooled to room temperature again. To the reaction mixture were added 150 ml of ethyl acetate and 150 ml of hexane. The reaction mixture was transferred to a separatory funnel and washed twice with water, once with an aqueous solution of sodium bicarbonate (5%), and finally twice with water. The solvent was distilled away under reduced pressure, and the desired product was obtained by vacuum distillation. Yield: 100.4 g (86% of theoretical value). b.p.: 109° to 113° C./0.1 mmHg.

(2) Preparation of Ethylene Oxide Adduct of 2,6-Dimethyl-4-t-octylphenol:

Into a 500 ml three-neck flask equipped with a stirrer and a reflux condenser were charged 98.4 g (0.42 mol) of 2,6-dimethyl-4-t-octylphenol, 35 g of xylene, and 2.4 g of potassium hydroxide. After heating the mixture to 140° C., ethylene oxide gas was bubbled into the mixture with stirring, so that ethylene oxide was polymerized to such an extent that the reaction mixture increased in weight by 185 g (equivalent to 4.2 mol of ethylene oxide). After cooling to room temperature, 250 ml of methanol was added, and the reaction product was neutralized with hydrochloric acid and then decolored by active carbon. The solvent was distilled away and 300 ml of ethyl acetate was added. The resulting insoluble salt was filtered off and the solvent was distilled away again. Thus, 280 g of a slightly yellowish oily compound was obtained.

(3) Oxidation of Ethylene Oxide Adduct:

Into a reactor equipped with a stirrer, a thermometer, and a reflux condenser were charged 12.3 g of the ethylene oxide adduct obtained in step (2), 100 ml of tetrahydrofuran, and 2.5 g of potassium t-butoxide. The mixture was stirred for 10 minutes at room temperature. After addition of 10 ml of allyl bromide, the mixture was heated under reflux for 3 hours. After cooling to room temperature, the inorganic salt which had separated out was filtered off. The filtrate was concentrated under reduced pressure, and the residues were dissolved again in 50 ml of methylene chloride. To the solution was added 6.3 g of m-chloroperbenzoic acid, followed by stirring the mixture for 24 hours at room temperature. The crystals which had separated out were filtered off. The filtrate was concentrated at a temperature lower than 25° C. under reduced pressure. The residue was dissolved again in 50 ml of methanol. To the solution was added 30 ml of Amberlite IRA-400, followed by stirring for 30 minutes at room temperature. The solids were filtered off and the solvent was distilled away under reduced pressure. The solvent was completely distilled away by heating at 60° C. for 2 hours under a vacuum (1 mmHg). Thus, the desired product in oily form was obtained. Yield: 12.8 g (96% of theoretican value).

SYNTHESIS EXAMPLE 2

Synthesis of Compound 2

(1) Synthesis of 1,1-bis(2-Hydroxy-3,5-di-t-amylphenyl)ethane

Into a 300 ml three-neck flask equipped with a stirrer, a reflux condenser, and a water separator were charged 46.9 g (0.2 mol) of 2,4-di-t-amylphenol, 6.6 g of paraaldehyde, 0.4 g of p-toluenesulfonic acid monohydrate, and 50 ml of toluene. The reaction was carried out for 2 hours in a water bath at 70° C. During the reaction, the flask was evacuated to 130 mmHg and then to 80 mmHg so that the water formed by the reaction was removed by azeotropic distillation. After the reaction was completed, 50 ml of toluene was added and the resulting solution was washed with five 50 ml portions of water. After toluene had been distilled away, the residue was recrystallized from a methanol/water (200/22 ml) mixed solvent. Thus, 31.9 g of the desired product was obtained. Yield: 65%. m.p.: 118° to 120° C.

(2) Preparation of Ethylene Oxide Adduct of 1,1-bis(2-Hydroxy-3,5-di-t-amylphenyl)ethane:

Into a 500 ml three-neck flask equipped with a stirrer and a reflux condenser were charged 124 g (0.25 mol) of 1,1-bis(2-hydroxy-3,5-di-t-amylphenyl)ethane, 2.8 g of potassium hydroxide, and 44 g of diethylene glycol dimethyl ether. After heating to 70° C., ethylene oxide gas was bubbled into the mixture with stirring. Five hours later, the temperature was increased to 140° C. and polymerization of ethylene oxide was continued. When the reaction mixture increased in weight by 308 g (equivalent to 7 mol of ethylene oxide), the bubbling of ethylene oxide gas was stopped. After cooling to room temperature, 500 ml of methanol was added, and the reaction product was neutralized with hydrochloric acid and then decolored with active carbon. The solvent was distilled away and 500 ml of ethyl acetate was added. The resulting insoluble salt was filtered off and the solvent was distilled away again. Thus, 351 g of a slightly yellowish waxy compound was obtained.

(3) Oxidation of Ethylene Oxide Adduct:

Into a reactor equipped with a stirrer, a thermometer, and a reflux condenser were charged 172.8 g of the ethylene oxide adduct obtained in step (2), 500 ml of tetrahydrofuran, and 25.0 g of potassium t-butoxide little by little. After completion of addition, the mixture was stirred for 30 minutes at room temperature. With continued stirring, 100 ml of allyl bromide was added. The mixture was heated under reflux for 3 hours. After cooling to room temperature, the inorganic salt which had separated out was filtered off. The filtrate was concentrated under reduced pressure, and the oily residue was dissolved again in 500 ml of methylene chloride. To the solution was added 86.3 g of m-chloroperbenzoic acid, followed by stirring for 24 hours at room temperature. The crystals which had separated out were filtered off. To the filtrate was added 1.2 liters of toluene, and methylene chloride was distilled away under reduced pressure. The toluene solution was transferred to a separatory funnel and washed with 500 ml each of a saturated aqueous solution of sodium sulfate, 1N sodium hydroxide, and a saturated aqueous solution of sodium chloride, consecutively. After washing, the solution was dried over anhydrous sodium sulfate and the solvent was distilled away under reduced pressure. The solvent was completely distilled away by heating at 60°

C. for 2 hours under a vacuum (1 mmHg). Thus, the desired product in oily form was obtained. Yield: 151.8 g (82.5% of theoretical value).

SYNTHESIS EXAMPLE 3

Synthesis of Compound 16

(1) Synthesis of p-Dodecylphenol/Formaldehyde Resin:

Into a three-neck flask equipped with a stirrer, a reflux condenser, and a water separator were charged 262 g (1.0 mol) of p-dodecylphenol, 10 g of paraformaldehyde, 2 g of p-toluenesulfonic acid monohydrate, and 300 g of benzene. The mixture was heated with stirring for 3 hours in a water bath at 85° to 90° C., while the water was removed as formed. The quantity of water formed was 11.8 ml (theoretical quantity: 12.2 ml). After washing with five 300 ml portions of water, the solvent was distilled away. Thus, 270 g of a slightly yellowish resin was obtained. According to vapor pressure osmometry, this resin was found to have the average degree of condensation of 2.5.

(2) Preparation of Ethylene Oxide Adduct of p-Dodecylphenol/Formaldehyde Resin:

Into a 1 liter three-neck flask equipped with a stirrer and a reflux condenser were charged 220 g of p-dodecyl/formaldehyde resin, 4.5 g of potassium hydroxide, and 200 ml of xylene. Ethylene oxide gas was bubbled into the mixture with stirring and heating at 140° C. until the reaction liquid increased in weight by 388 g (equivalent to 8.8 mol of ethylene oxide). After cooling to room temperature, 400 ml of methanol was added, and the reaction product was neutralized with hydrochloric acid and then decolored with active carbon. The solvent was distilled away and 500 ml of ethyl acetate was added. The resulting insoluble salt was filtered off and the solvent was distilled away again. Thus, 600 g of a slightly yellowish oily compound was obtained.

(3) Oxidation of Ethylene Oxide Adduct:

Into a reactor equipped with a stirrer, a thermometer, and a reflux condenser were charged 7.6 g of the ethylene oxide adduct obtained in step (2), 30 ml of tetrahyrofuran, and 1.3 g of potassium t-butoxide. The mixture was stirred for 10 minutes at room temperature. With continued stirring, 5 ml of allyl bromide was added. The mixture was heated under reflux for 3 hours. After cooling to room temperature, the inorganic salt which had separated out was filtered off. The filtrate was concentrated under reduced pressure, and the residue was dissolved again in 30 ml of methylene chloride. To the solution was added 5 g of m-chloroperbenzoic acid, followed by stirring the mixture for 20 hours at room temperature. Further, to the solution was added 10 ml of 1-hexene, followed by stirring the mixture for 24 hours at room temperature. After the addition of 30 ml of hexane, the reaction product was cooled with ice. The crystals which had separated out were filtered off. The solvent was distilled away under reduced pressure, and the solvent was completely distilled away by heating at 60° C. for 1 hour under a vacuum (1 mmHg). Thus, the desired product in oily form was obtained. Yield: 6.6 g (81% of theoretical value).

The nonionic surface active agent having reactive groups as represented by the formula (I), (II) or (III) may be used in an amount of 5 to 500 mg, preferably 20 to 200 mg, per $m^2$ of photographic light-sensitive material, depending on the type of photographic light-sensitive material used and the coating method employed.

In order to employ the nonionic surface active agent having a reactive group in the molecule of the present invention represented by the formulae (I), (II) and (III) to layers in the photographic light-sensitive materials, it is dissolved in water or an organic solvent such as methanol, ethanol or acetone, etc., or a solvent mixture of water and an organic solvent as described, and the resulting solution is then introduced into a light-sensitive emulsion layer or a light-insensitive auxiliary layer (for example, a backing layer, an antihalation layer, an interlayer or a protective layer, etc.) on the support or the solution is applied to the surface of the support by spraying, coating or immersion, followed by drying. Two or more nonionic surface active agents with a reactive group in the molecule of the present invention may be used as a mixture, if desired.

Further, the nonionic surface active agent used in the present invention may be employed together with a binder such as gelatin, polyvinyl alcohol, cellulose acetate, cellulose acetate phthalate, polyvinyl formal or polyvinyl butyral, etc., to form an antistatic layer.

Other antistatic agents can be used together in the layer containing the nonionic surface active agent having a reactive group in the molecule of the present invention represented by the formulae (I), (II) and (III) or other layers, by which a more suitable antistatic effect can be obtained. Examples of such antistatic agents which can be used include polymers as described in U.S. Pat. Nos. 2,882,157, 2,972,535, 3,062,785, 3,262,807, 3,514,291, 3,615,531, 3,753,716, 3,938,999, 4,070,180 and 4,147,550, German Pat. No. 2,800,466, and Japanese Patent Application (OPI) Nos. 91165/73, 94433/73, 46733/74, 54672/75, 94053/75 and 129520/77; surface active agents as described in U.S. Pat. Nos. 2,982,651, 3,428,456, 3,457,076, 3,454,625, 3,552,972 and 3,655,387, etc.; metal oxides and colloidal silica, etc., as described in U.S. Pat. Nos. 3,062,700, 3,245,833 and 3,525,621, etc.; and the so-called matting agents such as barium sulfate, strontium sulfate, polymethyl methacrylate, methyl methacrylatemethacrylic acid copolymer, colloidal silica or powdery silica, etc.

Further, polyol compounds as described in Japanese Patent Application (OPI) No. 89626/79 such as ethylene glycol, propylene glycol or 1,1,1-trimethylolpropane, etc., may be present in the layer containing the nonionic surface active agent having a reactive group in the molecule used in the present invention represented by the formulae (I), (II) and (III) or other layers, by which a more suitable antistatic effect can be obtained.

Examples of layers containing the nonionic surface active agent having a reactive group in the molecule used in the present invention include an emulsion layer, a subbing layer provided on the same side of the support as the emulsion layer, an interlayer, a surface protective layer, an overcoat layer, a backing layer provided on the opposite side of the support to the emulsion layer. Of these, surface layers (i.e., an outermost layer) such as a surface protective layer, an overcoat layer and a backing layer, etc., are preferred layers.

Examples of suitable supports to which the nonionic surface active agent having a reactive group in the molecule of the present invention can be applied include films of polyolefins such as polyethylene, polystyrene, cellulose derivatives such as cellulose triacetate and cellulose esters such as polyethylene terephthalate, etc., baryta paper, synthetic paper, and paper, both sides of which are covered with the above-described polymer film, and analogous supports.

An antihalation layer may be formed on the support used in the present invention. For this purpose, it is possible to use carbon black or various dyes, for example, oxonol dyes, azo dyes, arylidene dyes, styryl dyes, anthraquinone dyes, merocyanine dyes and tri- (or di-)arylmethane dyes, etc. Examples of binders used for the carbon black or dyes include cellulose acetate (di- or mono-), polyvinyl alcohol, polyvinyl butyral, polyvinyl acetal, polyvinyl formal, polymethacrylic acid ester, polyacrylic acid ester, polystyrene, styrene-maleic acid anhydride copolymer, polyvinyl acetate, vinyl acetate-maleic acid anhydride copolymer, methyl vinyl ether-maleic acid anhydride copolymer, polyvinylidene chloride and derivatives thereof.

Photographic light-sensitive materials to which the present invention is applicable include conventional black-and-white silver halide light-sensitive materials (for example, black-and-white light-sensitive materials for photographing, black-and-white light-sensitive materials for X-rays and black-and-white light-sensitive materials for printing, etc.), conventional multilayer color light-sensitive materials (for example, color reversal films, color negative films and color positive films, etc.) and various light-sensitive materials. The effect of the present invention is particularly strong with silver halide light-sensitive materials for high speed processing at a high temperature and silver halide light-sensitive materials having high sensitivity.

The photographic layers which can be present in the silver halide light-sensitive materials according to the present invention are illustrated briefly below.

Binders used in the photographic layers include proteins such as gelatin, or casein, etc., cellulose compounds such as carboxymethyl cellulose or hydroxyethyl cellulose, etc., saccharose derivatives such as agar, sodium alginate or starch derivatives, etc., synthetic hydrophilic colloids such as polyvinyl alcohol, poly-N-vinylpyrrolidone, polyacrylic acid copolymer, polyacrylamide or derivatives thereof or partially hydrolyzed products thereof.

The gelatin used can be the so-called lime-processed gelatin, acid-processed gelatin and enzyme-processed gelatin.

All or part of the gelatin can be replaced by synthetic high molecular weight substances. Further, the gelatin may be replaced by so-called gelatin derivatives, namely, those which are prepared by modifying functional groups in the molecule such as amino groups, imino groups, hydroxy groups or carboxyl groups with a reagent having a group capable of reacting with them, or graft polymers of gelatin wherein molecular chains of a high polymer are bonded thereto.

The kind of silver halide, the process for production thereof, the method of chemical sensitization, antifogging agents, stabilizers, hardeners, plasticizers, lubricants, coating assistants, matting agents, whitening agents, spectral sensitizing dyes, dyes and color couplers, etc., used in the silver halide emulsion layers and the surface protective layers, etc., in the photographic light-sensitive materials of the present invention are not particularly restricted. Information relating to these matters is described in, for example, *Product Licensing*, Vol. 92, pages 107 to 110 (December, 1971) and *Research Disclosure*, Vol. 176, pages 22 to 31 (December, 1978).

Particularly, there are a number of useful antifogging agents and stabilizers such as heterocyclic compounds including 4-hydroxy-6-methyl-1,3,3a,7-tetraazaindene-3-methylbenzothiazole and 1-phenyl-5-mercaptotetrazole, mercury-containing compounds, mercapto compounds or metal salts, etc. Examples of suitable hardeners include aldehyde compounds such as mucochloric acid, mucobromic acid, mucophenoxychloric acid, mucophenoxybromic acid, formaldehyde, dimethylolurea, trimethylolmelamine, glyoxal, monomethyl glyoxal, 2,3-dihydroxy-1,4-dioxane, 2,3-dihydroxy-5-methyl-1,4-dioxane, succinaldehyde, 2,5-dimethoxytetrahydrofuran or glutaraldehyde; active vinyl compounds such as divinyl sulfone, methylenebismaleimide, 5-acetyl-1,3-diacryloylhexahydro-s-triazine, 1,3,5-triacryloyl-hexahydro-s-triazine, 1,3,5-trivinylsulfonyl-hexahydro-s-triazine, bis(vinylsulfonylmethyl)ether, 1,3-bis(vinylsulfonylmethyl)propanol-2 or bis(α-vinylsulfonylacetamido)ethane; active halogen compounds such as 2,4-dichloro-6-hydroxy-s-triazine.sodium salt, 2,4-dichloro-6-methoxy-s-triazine, 2,4-dichloro-B 6-(4-sulfoanilino)-s-triazine.sodium salt, 2,4-dichloro-6-(2-sulfoethylamino)-s-triazine or N,N'-bis(2-chloroethylcarbamoyl)piperazine; epoxy compounds such as bis(2,3-epoxypropyl)methylpropyl ammonium.p-toluenesulfonate, 1,4-bis(2',3'-epoxypropyloxy)butane, 1,3,5-triglycidylisocyanurate or 1,3-diglycidyl-5-(γ-acetoxy-β-oxypropyl)isocyanurate; ethyleneimine compounds such as 2,4,6-triethyleneimino-s-triazine, 1,6-hexamethylene-N,N'-bisethyleneurea or bis-β-ethyleneiminoethyl thioether; methanesulfonic acid esters such as 1,2-di(methanesulfonyloxy)ethane, 1,4-di(methanesulfonyloxy)butane or 1,5-di(methanesulfonyloxy)pentane; carbodiimide compounds; isoxazole compounds; and inorganic compounds such as chromium alum.

Known surface active agents may be added to the photographic layers in the present invention. Examples of useful surface active agents include natural surface active agents such as saponin, etc.; nonionic surface active agents such as glycerin type agents or glycidol type agents; cationic surface active agents such as higher alkylamines, quaternary ammonium salts, pyridine and other heterocyclic derivatives, phosphonium or sulfonium compounds, etc.; anionic surface active agents containing acid groups such as carboxylic acids, sulfonic acids, phosphoric acids, sulfuric acid esters or phosphoric acid esters, etc.; and amphoteric surface active agents such as amino acids, aminosulfonic acids or sulfuric or phosphoric acid esters of aminoalcohols, etc. Further, fluorine-containing surface active agents can be used in combination therewith.

Further, the photographic light-sensitive materials of the present invention may contain alkyl acrylate type latexes as described in U.S. Pat. Nos. 3,411,911 and 3,411,912 and Japanese Patent Publication No. 5331/70 in the photographic layers.

The present invention is illustrated in greater detail by reference to the following example, but the present invention is not to be construed as being limited to the example.

EXAMPLE (1) Preparation of Samples:

To a polyethylene terephthalate film support having a thickness of 180μ which was subjected to undercoating, a silver halide emulsion layer having the following composition was applied and a protective layer having the following composition was applied to the silver halide emulsion layer and dried to prepare black-and-white silver halide light-sensitive materials. To the protective layer, a nonionic surface active agent of the present invention or a surface active agent for comparison was added.

| Emulsion Layer | |
|---|---|
| Thickness: about 5μ | |
| Composition and coating amount: | |
| Gelatin | 2.5 g/m² |
| Silver Iodobromide (silver iodide: 1.5% by mol) | 5 g/m² |
| 1-Phenyl-5-mercaptotetrazole | 25 mg/m² |
| Protective Layer | |
| Thickness: about 1μ | |
| Composition and coating amount: | |
| Gelatin | 1.7 g/m² |
| 2,6-Dichloro-6-hydroxy-1,3,5-triazine Sodium Salt | 10 mg/m² |
| Sodium Dodecylsulfate | 10 mg/m² |
| Nonionic Surface Active Agent of the Present Invention or Nonionic Surface Active Agent for Comparison | 60 mg/m² |

(2) Method of Determining Antistatic Property:

The antistatic property was determined by measuring surface resistivity and generation of static marks.

Measurement of the surface resistivity was carried out by placing a test strip of the sample between brass electrodes (using stainless steel in the part contacting the test strip) having a length of 10 cm with an electrode separation of 0.14 cm and measuring a 1 minute value using an insulation tester: Type TR 8651 produced by Takeda Riekn Co.

The static mark generation test was carried out by a method which comprises placing an unexposed light-sensitive material on a rubber sheet so that the surface containing the antistatic agent faced the rubber sheet, pressing the light-sensitive material with a rubber roll, and separating the material to generate static marks.

The surface resistivity was measured at 25° C. and 25% RH and the static mark generation test was carried out at 25° C. and 25% RH. Conditioning of the test strips of the sample was carried out under the above-described conditions for one day and night.

In order to evaluate the degree of generation of static marks, each sample was developed at 20° C. for 5 minutes with a developing solution having the following composition.

| Composition of Developing Solution: | |
|---|---|
| N—Methyl-p-aminophenol Sulfate | 4 g |
| Sodium Sulfite (anhydrous) | 60 g |
| Hydroquinone | 10 g |
| Sodium Carbonate (monohydrate) | 53 g |
| Potassium Bromide | 25 g |
| Water to make | 1 liter |

Evaluation of the static mark was carried out according to the following standard consisting of five stages classified with respect to the rate of area of portions exposed with electric discharge.
A: less than 1%
B: from 1 to 10%
C: from 11 to 30%
D: from 31 to 50%
E: more than 50%

(3) Method of Testing Deterioration with Passage of Time:

After the above-described samples and high quality white paper were conditioned at 25° C. and 70% RH for 1 hour, the high quality paper was placed between two samples so that both sides of the high quality paper cane into contact with the surface of the emulsion layer side of the samples, and they were placed in a polyethylene laminated bag and sealed. These samples were allowed to stand at room temperature (25° C.) for 1 week with application of a weight of 40 g/cm². Thereafter, the antistatic property was measured according to the above-described method of determining antistatic property and it was compared with that initially obtained.

(4) Method of Testing Photographic Properties:

After the above-described sample was exposed to light using a tungsten lamp through a filter SP-14 produced by Fuji Photo Film Co., the sample was developed with a developing solution having the following composition (at 35° C. for 30 seconds), fixed and washed. Then, the photographic properties were examined.

| Composition of Developing Solution: | |
|---|---|
| Hot Water | 800 ml |
| Sodium Tetrapolyphosphate | 2.0 g |
| Sodium Sulfite (anhydrous) | 50 g |
| Hydroquinone | 10 g |
| Sodium Carbonate (monohydrate) | 40 g |
| 1-Phenyl-3-pyrazolidone | 0.3 g |
| Potassium Bromide | 2.0 g |
| Water to make | 1000 ml |

(5) Measurement of Degree of Screen Contamination:

Test strips and a screen LT-II produced by Dainippon Toryo Co. were conditioned at 30° C. and 80% RH for 1 day. After 100 test strips were allowed to pass in a cassette using the LT-II screen under the same conditions, exposure was carried out with X-rays and the degree of uneven density was determined.

Evaluation of the degree of screen contamination was carried out according to the following standard consisting of four stages.
A: Generation of uneven density was not observed.
B: Uneven density was slightly generated.
C: Uneven density was considerably generated.
D: Uneven density was markedly generated.

The results of each stes (2) to (5) are shown in Table 1 below.

(6) Method for Testing Contamination in Development:

A sample of photographic material coated with an emulsion layer and a surface protective layer was cut into pieces, each measuring 30.5 cm by 25.4 cm. The test pieces were uniformly exposed so that they had an optical density of 1.3 after development. After exposure, 100 test pieces were developed continuously using an automatic developing machine, Model RU, made by Fuji Photo Film Co., Ltd. (containing developing bath: Fuji Photo Film's RD-III at 35° C.; fixing bath: Fuji Photo Film's Fuji-F at 35° C.; and washing bath). The degree of contamination was evaluated by counting the number of spots caused by defective desilvering in the 100th test piece.

TABLE 1

| | | Antistatic Property | | | | | | |
|---|---|---|---|---|---|---|---|---|
| | | Before Passage of Time | | After Passage of Time | | Photographic | Degree of | Number of |
| Sample No. | Antistatic Agent | Surface Resistivity ($\Omega$) | Static Mark | Surface Resistivity ($\Omega$) | Static Mark | Sensitivity (relative value) | Screen Contamination | Contamination in Development |
| 1 | Compound 2 (Invention) | $4.9 \times 10^{11}$ | A | $4.2 \times 10^{11}$ | A | 97 | A | 0 |
| 2 | Compound 3 (Invention) | $6.2 \times 10^{11}$ | A | $5.1 \times 10^{11}$ | A | 100 | A | 0 |
| 3 | Compound 4 (Invention) | $4.0 \times 10^{11}$ | A | $4.7 \times 10^{11}$ | A | 99 | A | 0 |
| 4 | Compound 16 (Invention) | $5.7 \times 10^{11}$ | A | $6.3 \times 10^{11}$ | A | 96 | A | 0 |
| 5 | Comparative Compound I | $2.3 \times 10^{11}$ | A | $8.7 \times 10^{13}$ | D | 78 | D | 5 |
| 6 | Comparative Compound II | $3.0 \times 10^{11}$ | A | $8.1 \times 10^{13}$ | D | 73 | D | 11 |
| 7 | Comparative Compound III | $5.9 \times 10^{11}$ | A | $9.8 \times 10^{12}$ | C | 85 | C | 50 |
| 8 | Comparative Compound IV | $4.5 \times 10^{11}$ | A | $5.1 \times 10^{11}$ | A | 70 | B | 1 |
| 9 | Blank | $5.9 \times 10^{14}$ | E | $7.6 \times 10^{14}$ | E | 100 | A | 0 |

Comparative Compound I
(n)$C_{12}H_{25}O$—(—$CH_2CH_2O$—)$_{10}$—H
(British Patent 861,134)

Comparative Compound II

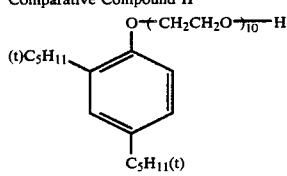

Comparative Compound III

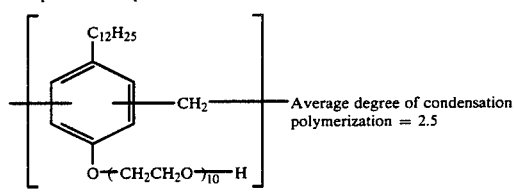

(U.S. Pat. No. 3,850,641)

Comparative Compound IV

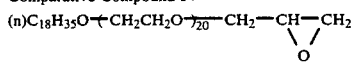

(Japanese Patent Application (OPI) No. 74246/81, Compound (3))

As the results in Table 1 show, the photographic material containing the nonionic surface active agent having a reactive group in the molecule used in this invention has a low surface resistivity and is free of static marks. Moreover, the nonionic surface active agent hardly decreases the sensitivity of the photographic material and does not cause the problem of screen and processing contaminations. The good antistatic performance remains almost unchanged after the lapse of time.

On the other hand, Comparative Compounds I and II each having one polyoxyethylene chain in the molecule initially exhibit antistatic performance but lose it with time. Moreover, these compounds decrease the sensitivity and cause severe screen contamination in the development process.

Comparative Compound III, which is an ethylene oxide adduct of a phenol-formaldehyde resin, also decreases in antistatic performance with time, reduces the sensitivity, and causes screen contamination and processing soiling.

Comparative Compound IV having a reactive group has good antistatic property and durability and does not cause screen contamination and processing soiling, but it reduces the sensitivity.

1. A silver halide photographic light-sensitive material as recited in the claim, wherein the layer containing the nonionic surface active agent having reactive groups as represented by the formula (I), (II) or (III) is the uppermost layer.

2. A silver halide photographic light-sensitive material as recited in the claim, wherein the layer containing the nonionic surface active agent having reactive groups as represented by the formula (I), (II) or (III) is the surface protective layer.

3. A silver halide photographic light-sensitive material as recited in the claim, wherein the nonionic surface active agent having reactive groups is a compound as represented by the formula (II).

4. A silver halide photographic light-sensitive material as recited in the claim, wherein the nonionic surface active agent having reactive groups is a compound as represented by the formula (III).

5. A silver halide photographic light-sensitive material as recited in the claim, wherein $R_1$, $R_2$ and $R_3'$ are alkyl groups.

6. A silver halide photographic light-sensitive material as recited in the claim, wherein $R_3$ and $R_4$ are independently hydrogen atoms, alkyl groups, or phenyl groups.

7. A static preventing method which comprises incorporating the gelatin-containing layer of the silver halide photographic material with at least one kind of the nonionic surface active agent containing reactive groups as represented by the formula (I), (II) or (III).

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive element comprising a support, and at least one silver halide emulsion layer, and containing gelatin in at least one layer of the element, wherein at least one gelatin containing layer contains at least one antistatic nonionic surface active agent having reactive groups, the agent being incorporated in an amount effective to prevent static and being represented by the following formula (I), (II) or (III):

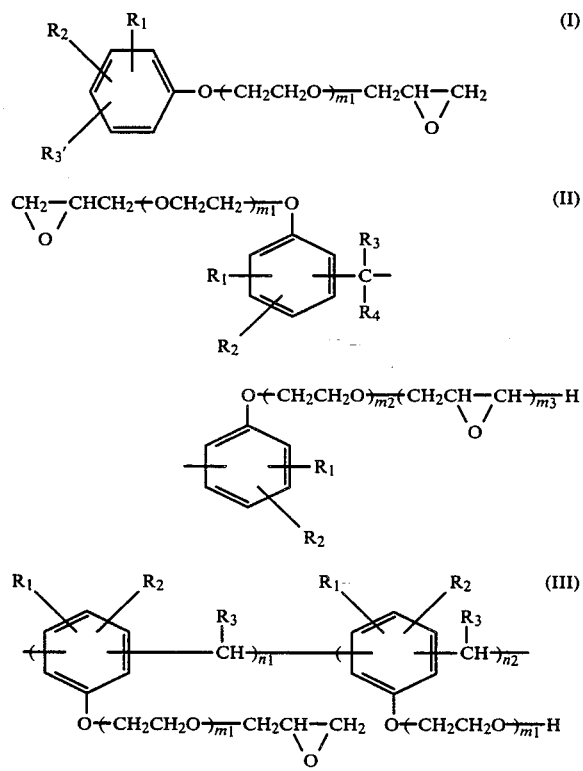

wherein $R_1$, $R_2$ and $R_3'$ each represents a hydrogen atom or a halogen atom, or an unsubstituted or substituted alkyl, aryl, alkoxy, acyl, amido, sulfonamido, carbamoyl, or sulfamoyl group, $R_3$ and $R_4$ each represents a hydrogen atom, an unsubstituted or substituted alkyl or aryl group, or a heteroaromatic ring, $R_3$ and $R_4$ may combine to form a ring; $m_1$ and $m_2$, which may be the same or different, are 5 to 30, each representing the average degree of polymerization of ethylene oxide, $m_3$ is 0 or 1; and $n_1$ and $n_2$ represent the ratios in the copolymer, and $n_1$ is 1 to 100 and $n_2$ is 0 to 99, the sum thereof being 100, wherein said agent represented by the formula (I), (II) or (III) is present in an amount of 5 to 500 mg per $m^2$ of said photographic light-sensitive material.

2. The silver halide photographic light-sensitive material of claim 1, wherein $R_1$, $R_2$ and $R_3'$ are a hydrogen atom, a halogen atom, a $C_{1-20}$ unsubstituted or substituted alkyl group, an unsubstituted or substituted aryl group, an unsubstituted or substituted alkoxy group having the formula $-OR_5$, wherein $R_5$ is a $C_{1-20}$ unsubstituted or substituted alkyl or aryl group, an acyl group represented by the formula $-COR_5$ where $R_5$ is as described above, an amido group represented by the formula $-NR_6COR_5$ wherein $R_6$ is a hydrogen atom or a $C_{1-20}$ alkyl group as described above for $R_5$, and $R_5$ is as described above, a sulfonamido group represented by the formula $-NR_6SO_2R_5$, wherein $R_5$ and $R_6$ are as described above, a carbamoyl group represented by the formula

wherein $R_6$ is as described above or a sulfamoyl group represented by the formula

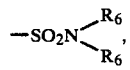

wherein $R_6$ is as described above.

3. The silver halide photographic light-sensitive material of claim 1, wherein $R_1$, $R_2$ and $R_3'$ are an unsubstituted or substituted alkyl group, and $R_3$ and $R_4$ are a hydrogen atom, an unsubstituted or substituted alkyl group or a phenyl group.

4. The silver halide photographic light-sensitive material of claim 1, wherein $m_1$ and $m_2$ are 8 to 20.

5. The silver halide photographic light-sensitive material of claim 1, wherein said agent represented by the formula (I), (II) or (III) is present in an amount of 20 to 200 mg per $m^2$ of said photographic light-sensitive material.

6. A silver halide photographic light-sensitive material of claim 1, wherein the layer containing the nonionic surface active agent having reactive groups as represented by the formula (I), (II) or (III) is the uppermost layer.

7. A silver halide photographic light-sensitive material of claim 1, wherein the layer containing the nonionic surface active agent having reactive groups as represented by the formula (I), (II) or (III) is the surface protective layer.

8. A silver halide photographic light-sensitive material of claim 1, wherein the nonionic surface active agent having reactive groups is a compound as represented by the formula (II).

9. A silver halide photographic light-sensitive material of claim 1, wherein the nonionic surface active agent having reactive groups is a compound as represented by the formula (III).

10. A method for preventing static in a silver halide photographic element comprising a support and at least one silver halide emulsion layer, and containing gelatin in at least one layer of the element, the step of incorporating in a gelatin-containing layer of the element at least one antistatic nonionic surface active agent containing reactive groups as represented by the formula (I), (II) or (III):

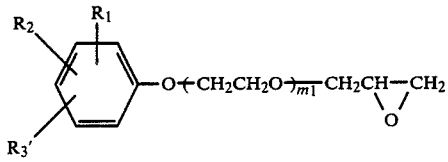
(I)

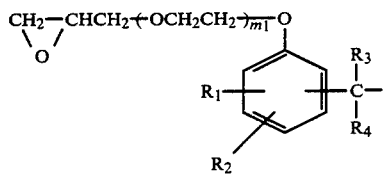
(II)

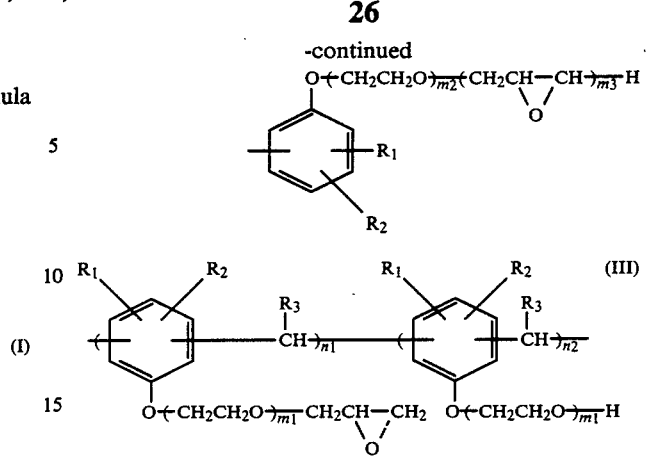

wherein $R_1$, $R_2$ and $R_3'$ each represents a hydrogen atom or a halogen atom, or an unsubstituted or substituted alkyl, aryl, alkoxyl, acyl, amido, sulfonamido, carbamoyl, or sulfamoyl group; $R_3$ and $R_4$ each represents a hydrogen atom, an unsubstituted or substituted alkyl or aryl group, or a heteroaromatic ring, $R_3$ and $R_4$ may combine to form a ring; $m_1$ and $m_2$, which may be the same or different, are 5 to 30, each representing the average degree of polymerization of ethylene oxide; $m_3$ is 0 or 1; $n_1$ and $n_2$ represents the ratios in the copolymer, and $n_1$ is 1 to 100 and $n_2$ is 0 to 99, the sum thereof being 100, wherein said agent represented by the formula (I), (II) or (III) is present in an amount of 5 to 500 mg per $m^2$ of said photographic light-sensitive material.

* * * * *